S. N. LONG.
CASTER FOR FURNITURE.
No. 77,743. Patented May 12, 1868.
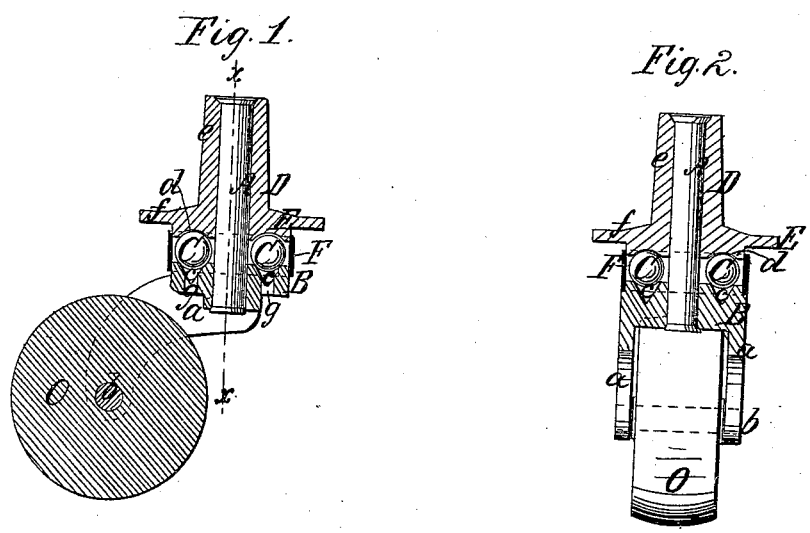
Witnesses:
L. E. Batcheller
W. J. Cambridge
Inventor:
Samuel N. Long
By his Attorneys
Fischemacher & Stearns

United States Patent Office.

SAMUEL N. LONG, OF SOUTH CHATHAM, ASSIGNOR TO HIMSELF AND LINCOLN B. BEARSE, OF BARNSTABLE, MASSACHUSETTS.

Letters Patent No. 77,743, dated May 12, 1868.

IMPROVED CASTER FOR FURNITURE.

The Schedule referred to in these Letters Patent and making part of the same.

TO ALL WHOM IT MAY CONCERN:

Be it known that I, SAMUEL N. LONG, of South Chatham, in the county of Barnstable, and State of Massachusetts, have invented certain Improvements in Casters for Furniture, Trunks, &c., of which the following is a full, clear, and exact description, reference being had to the accompanying drawings, making part of this specification, in which—

Figure 1 is a central vertical section through a caster, with my improvements applied thereto.

Figure 2 is a section on the line x x of fig. 1.

The object of my invention is to provide a caster for various descriptions of furniture, trunks, and other articles, which require to be moved frequently from place to place; and my invention consists in two or more balls, which receive the weight of the article, and bear upon and roll over the concave or grooved surface formed in the top of the plate to which the wheel is attached, by which construction the friction is very materially reduced, thus allowing the article to be moved with extreme facility in any direction.

To enable others skilled in the art to understand and use my invention, I will proceed to describe the manner in which I have carried it out.

In the said drawings, A represents an upright pin or spindle, which projects up through the centre of a circular cap, B, formed at the top, and at the junction of the two arms or bearings $a\, a$, which support the shaft $b$, upon which the wheel O revolves.

Within the circular cap B is formed a circular V-shaped groove, $c$, in which a series of spherical balls, C C, of hardened steel, is made to revolve in the following manner:

D is a sleeve which fits loosely around the vertical pin or spindle A, and has formed at its bottom a circular flange or plate, E, the under side of which is provided with a circular concave groove, $d$, of the form seen in section. The portion, $e$, of this loose sleeve passes up into a recess of corresponding form, made in the bottom of the leg of the piece of furniture, or in the bottom of each corner of the trunk to which it is applied, the bottom of the leg or trunk fitting snugly against and bearing down upon the upper surface, $f$, of the flange E, which is thus brought down by the weight so as to bear upon the series of balls C C.

When the article to which the caster is attached is being moved from place to place, the balls are caused to revolve upon their own axes, and at the same time to travel around within the V-shaped groove $c$, formed in the circular cap B, and the circular groove $d$ in the under side of the flange or plate E, which bears upon the tops of the balls, by which means the friction of the parts is considerably reduced, thereby enabling one to move the article about, with the expenditure of but little power.

The loose sleeve D, with its flange E, may either fit into the recess prepared for it in the leg or corner of the article, or it may be secured thereto by screws passing through holes $g$, provided for them in the flange.

F is a circular ring, which encloses the open space between the bottom of the flange E and top of the circular cap B, for the purpose of excluding dirt or any object which might obstruct the proper action of the spherical balls.

Should, however, any substance enter the V-shaped groove, it will be carried around by the revolution of the balls in the bottom of the groove $c$, until it arrives at one of the holes $g$, which pass through to the bottom of the cap, and by means of which the obstruction is allowed to be carried out of the way.

An article of considerable weight may be readily moved in any direction without liability of injuring the floor or carpet of the room on which it is placed I am aware that a series of spherical balls has been used in the construction of furniture-casters, and specially disclaim the construction and arrangement as shown in the patent of J. White, dated December 24, 1867. In White's manner of using the spherical balls, they are caused to roll in a groove in which they snugly fit, and from which dirt cannot escape if it once enters. Thus, the free movement of the balls may be easily retarded or entirely prevented, while, by my V-shaped groove $c$, any dust or other substance entering will be carried around in said groove until it reaches one of the holes $g$, through which it will be carried out, without interruption or damage to the caster.

The spindle heretofore in use for casters has had a bearing directly upon the leg of the furniture, as in White's patent, referred to, and soon wears the hole larger, and the lateral play soon increases to such an extent as to cause the spindle, if violently pressed or shaken, to be broken or thrown out of its vertical position, thus rendering the removal of an article from place to place difficult. I rivet the top of my spindle to the top of the loose sleeve D, the portion, $e$, of this sleeve passing up into a recess of corresponding form, made in the bottom of the leg of the furniture, or bottom of a trunk, and forming a secure bearing for the spindle A to revolve in, thus preventing any pry or leverage of the spindle in the leg.

The caps or plates B and E are held permanently together by the spindle A, and the nut used by J. White in his patent is dispensed with, thus simplifying the caster and reducing its cost.

Claim.

What I claim as my invention, and desire to secure by Letters Patent, is—

The combination of the sleeve D with the spindle A, with the plate B, having the groove $c$ and the opening $g$, all constructed, arranged, and operating as and for the purpose described.

SAMUEL N. LONG.

Witnesses:
 N. W. STEARNS,
 P. E. TESCHEMACHER.